United States Patent [19]

Tsukai et al.

[11] Patent Number: 4,624,526
[45] Date of Patent: Nov. 25, 1986

[54] OPTICAL PICKUP DEVICE

[75] Inventors: Yoshiyuki Tsukai; Akihiro Tachibana, both of Tokorozawa, Japan

[73] Assignee: Pioneer Electronic Corporation, Tokyo, Japan

[21] Appl. No.: 564,828

[22] Filed: Dec. 23, 1983

[30] Foreign Application Priority Data

Dec. 25, 1982 [JP] Japan ............... 57-233886

[51] Int. Cl.⁴ ............ G02B 5/32; G02B 5/18; G11B 7/13
[52] U.S. Cl. ............... 350/3.72; 350/162.17; 369/109
[58] Field of Search ............ 350/3.7, 3.72, 162.12, 350/162.16, 162.17, 162.22; 369/109; 356/354

[56] References Cited

U.S. PATENT DOCUMENTS

| | | | |
|---|---|---|---|
| 3,614,235 | 10/1971 | Munnerlyn | 356/354 |
| 3,732,363 | 5/1973 | Glenn, Jr. | 369/109 |
| 4,253,723 | 3/1981 | Kojima et al. | 369/109 |
| 4,312,559 | 1/1982 | Kojima et al. | 350/3.72 |
| 4,440,839 | 4/1984 | Mottier | 350/3.7 |
| 4,462,095 | 7/1984 | Chen | 369/44 |
| 4,488,042 | 12/1984 | Clay et al. | 350/3.72 |
| 4,497,534 | 2/1985 | Sincerbox | 350/3.72 |

Primary Examiner—John K. Corbin
Assistant Examiner—B. S. Shapiro
Attorney, Agent, or Firm—Fleit, Jacobson, Cohn & Price

[57] ABSTRACT

An optical pickup device to be used in a system for optically playing back recorded information comprises a diffraction grating or a hologram lens instead of a prism for directing a read-out light beam emitted by a light source to the surface of the recording medium and separating a reflection beam reflected by the surface of a recording medium from the read-out light beam. By the elimination of the prism, the size of the pickup device is substantially reduced and the production cost of the device is also reduced.

4 Claims, 7 Drawing Figures

OPTICAL PICKUP DEVICE

BACKGROUND OF THE INVENTION

1. Field of the Invention

The present invention relates to an optical pickup device and more particularly to an optical pickup device to be used in a system for optically reading out recorded information.

2. Description of Background Information

In the case of the conventional optical pickup device, it is necessary to use a prism for separating a reflection light beam from a read-out light beam emitted from a light source. The half prism or the Wollaston prism (Wollaston double image prism) are examples of such a prism. In the case of the half prism, the reflection beam emerging from the prism is directed substantially normal to the path of the read-out light beam. Therefore, the size, especially the width, of the pickup device inevitably becomes large, which further becomes an obstacle to the reduction in size of the system as a whole. With a Wollaston prism, the disadvantage is that the production cost is substantially high.

SUMMARY OF THE INVENTION

An object of the present invention is therefore to provide an optical pickup device which is simplified by eliminating the use of the prism and is smaller in size as compared to the conventional pickup devices, which allows much freedom of the design of the system in which the pickup device is incorporated.

Another object of the present invention is to provide an optical pickup device which can be produced at a relatively low cost.

According to the present invention, an optical pickup device comprises a source of illuminating light beam, a separating means for directing the illuminating light beam towards the surface of a recording medium and separating a reflection beam reflected by the surface of the recording medium from the illuminating light beam, and a photo detection means for receiving at least a part of the reflection beam. The pickup device is characterized in that the separating means has a function for diffracting an incident light beam and the photo detection means is placed at a position for receiving a diffraction beam having a selected order of the reflection beam.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description taken in connection with the accompanying drawings, in which.

DETAILED DESCRIPTION OF THE PREFERRED EMBODIMENTS

Figure 1:
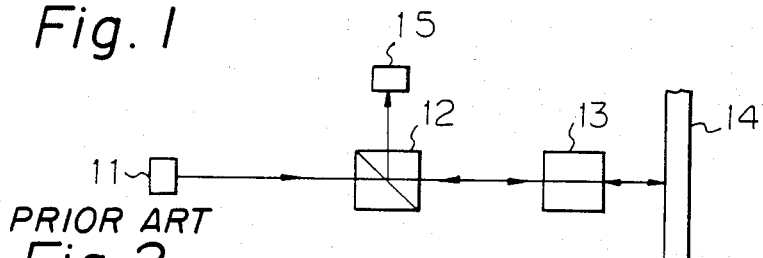
FIG. 1 is a schematical view of a conventional pickup device with a half prism.
Figure 2:
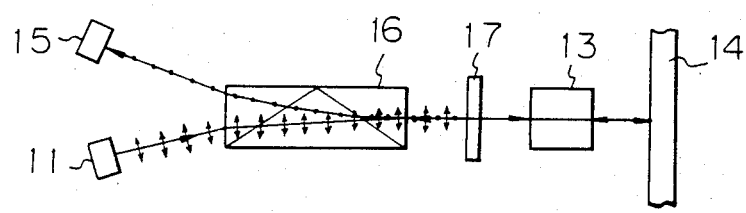
FIG. 2 is a schematical view similar to FIG. 1, while showing another conventional pickup device with a Wollaston prism.

Before entering into the explanation of the preferred embodiment of the optical pickup device of the present invention, reference is first made to FIGS. 1 and 2 in which examples of the prior art device are illustrated.

In the case of the optical pickup device shown in FIG. 1, an information read out light beam generated at a laser beam source 11 is applied to an object lens 13 via a half prism 12 acting as a beam splitting device, and converged on a recording surface of a recording disc 14. A reflection beam from the recording disc 14 is again directed into the object lens 13 by which the reflection beam is transformed into a parallel light. This parallel light reflection beam is then applied to the half prism 12 by which the reflection beam is again reflected and directed to a direction normal to the light beam from the light source 11 and received by a receiving surface of a light receiving device 15. The light receiving device 15 is for example, a photo transistor which transduces the intensity of the incident light into an electric signal.

In the case of the pickup device of FIG. 2, a light from the laser source 11 is directed to a Wollaston double image prism 16. In the Wollaston double image prism 16, polarized light beams having different planes of vibration, such as the P-polarized light (vibration direction being parallel to the incident plane) and the S-polarized light (vibration direction being normal to the incident light beam), are refracted differently from each other. One of these polarized light, say the P-polarized light is directed to the object lens 13 via the quarter wave plate 17 in which the input polarized light is converted into a non-linearly polarized light beam. The light beam through the object lens 13 is then directed into the surface of the disc 14 and via these optical elements the incident light beam is reflected and again directed to the object lens 13. After passing through the object lens 13, the reflection light beam is then applied to the quarter wave plate 17 by which the light beam is converted into an S-polarized light beam. The thus generated S-polarized light beam is then applied to the Wollaston prism 16 by which the light beam is directed to the photo detector 15.

It will be seen from the foregoing, that, in both of the conventional pickup systems shown in FIGS. 1 and 2, a prism (even though their types are different) is used for the purpose of separating the reflection light beam from the incident light beam produced by a light source. Several disadvantages have arisen from the use of the prism. Especially, in the case of the half prism of the pickup system of FIG. 1, the angular difference between the incident light beam and the light beam emerging from this prism is as large as 90°. Due to this large angular difference, it was difficult to reduce the size (especially the width) of the pickup system. On the other hand, in the case of the pickup system of FIG. 2, the drawback was that the Wollaston prism is expensive and the use of this type of prism has resulted in a high production cost of the pickup system.

Figure 3:
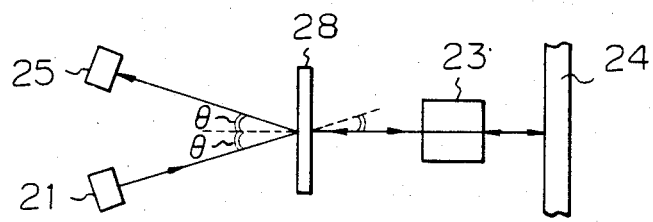
FIG. 3 is a schematical view of the pickup device according to the present invention.

Referring to FIG. 3, the embodiment of the pickup system according to the present invention will be explained hereinafter.

As shown, a light beam radiated from a laser source 21 is applied to a diffraction grating 28 used as a beam splitter, at an angle of incidence $\theta$. In the case of diffraction gratings, the distribution of the diffraction light passed through is determined in accordance with the depth of the slits forming the grating and the distance P between each slit. When the depth of the slit d is equal to $\lambda/2$ ($d=\lambda/2$), then only the first order diffraction beam is obtained. Further, the angle of light leaving the diffraction grating 28 is determined in accordance with the distance P.

In the case of this embodiment, a type of diffraction grating which produces only the first order diffraction light and the angle of the beam leaving from the diffraction grating is equal to $\theta$, is chosen as the diffraction grating 28. The light applied to the diffraction grating 28 at the angle of $\theta$, is split into two first order diffraction beams one of which is directed to an object lens 23 at right angle thereto. For the purpose of simplification, the other light beam from the diffraction grating is not illustrated in FIG. 3.

The light beam converged by the object lens and focused on the surface of the recording disc 24 is then reflected by this surface and directed to the object lens 23 once more. By means of the object lens 23, the reflection beam is converted to a parallel light which is applied to the diffraction grating 28 at right angle thereto. Through the grating 28, only two first order diffraction beams are radiated at angles of $\pm\theta$. Then one of the diffraction beams which are not the one directed to the source of laser beam 11, is received by a photo detector 25.

Figure 4:
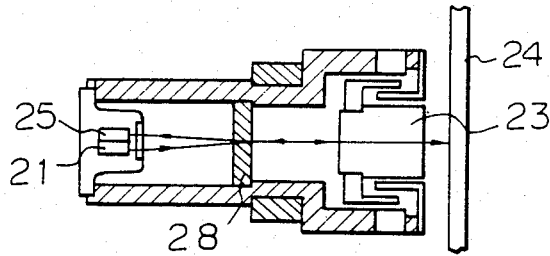
FIG. 4 is a sectional view of a pickup device constructed according to the principle illustrated in FIG. 3.

FIG. 4 is a sectional view of a pickup device which has the construction having been described hereinabove and shown in FIG. 3. In FIGS. 3 and 4, the like reference numerals denote like parts or corresponding elements.

In FIG. 4, the light beam from the laser source 21 is directed to the surface of the recording disc 24 and the reflection beam is received by the photo detector 25 in the same manner as described with reference to FIG. 3. As shown, the actual angular difference between the light beam radiated from the laser source and the reflection beam applied to the photo detector can be extremely small, and as the result, the diameter of the pickup device is reduced to a considerably smaller size. Consequently, the reduction in the size of the pickup device as a whole becomes possible.

It is to be noted that even in the above embodiment, the diffraction grating of the type which radiates only the first order diffraction beams is used, the diffraction grating may be of a type which radiates only the zero order diffraction beam. In that case, the radiation angle of this zero order diffraction beam will be suitably selected, so as to be received by the photo detector 25. Further, it is possible to use a diffraction grating of the type that permits not only the first order diffraction beam and also the zero order diffraction beam, and to construct the pickup device to receive only one of the first order diffraction beam and zero order diffraction beam.

Figure 5A:
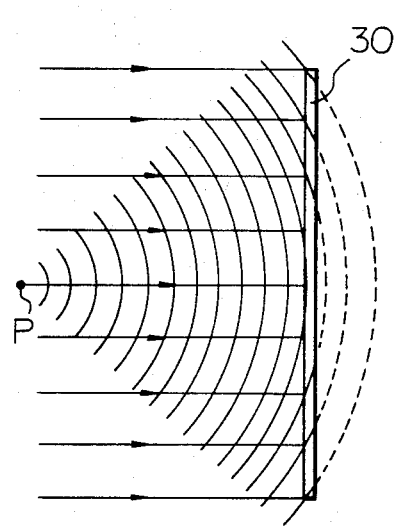
FIGS. 5A and 5B show the principle of the hologram which is used in the second embodiment of the pickup device.
Figure 5B:
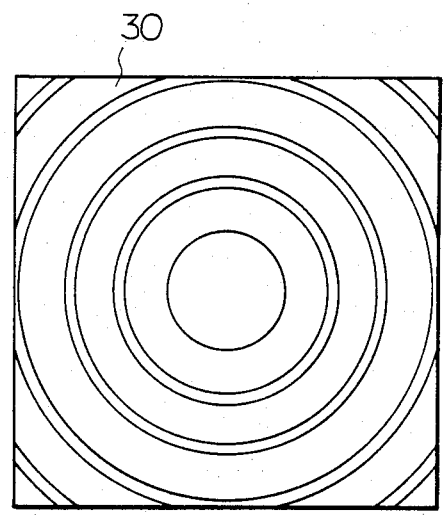

Reference is now made to FIGS. 5A and 5B which illustrate the principle of the second embodiment of the pickup device according to the present invention in which a hologram lens is used instead of the diffraction grating. This is based on the fact that the hologram has the ability of diffracting the incident light beam. FIG. 5A is a view for explaining the manner of operation of the hologram. As shown, a spherical wavefronts arising from a point source P are directed to a photographic plate 30 as a light from an object. The photographic plate 30 is also exposed to a coherent reference beam having a plane of the wave parallel to the surface of the photographic plate 30. FIG. 5B shows a so-called Fresnel hologram produced on the photographic plate 30 by the above exposure and the subsequent processing, which is in the form of a plurality of co-axial interference fringes, or Fresnel zones.

Figure 6:
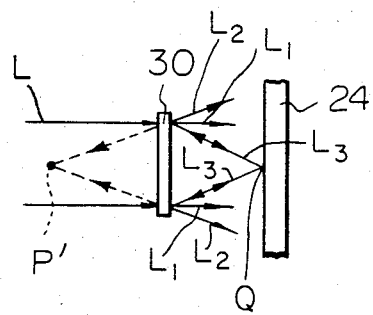
FIG. 6 is a partial view of the second embodiment in which a hologram lens is used instead of a conventional object lens.

As shown in FIG. 6 when a monochromatic illumination beam L, which is identical to the reference beam of FIG. 5A, is radiated to the Fresnel hologram 30, it is known that the transmitted beams are split into three waves $L_1$, $L_2$, $L_3$.

The first wave $L_1$ is a zero order diffraction wave which has the direction and the phase identical to those of the incident light, and the second wave $L_2$ has the direction and the phase identical to those of the light from the object which has formed the Fresnel zones, and gives a virtual image P' of the object. The third wave $L_3$ forms the real image Q of the object.

In other words, the first wave $L_1$ is a single zero order diffraction beam parallel to the illumination beam, and the second and third waves $L_2$ and $L_3$ are a pair of first order diffraction beams one of which may be used to produce a real image Q on the recording surface of the recording disc 24. Thus, the illumination beam can be focused on the recording surface without using an object lens which has been used in prior art pickup devices The reflection beam from the surface of the recording disc is again applied to the Fresnel hologram 30 where the reflection beam is split into the zero order diffraction beam and the first order diffraction beams (not shown). However, it is to be noted that, after passing through the hologram lens 30, the reflection beam does not pass through the same path of the illumination beam. In order to detect the reflection light, it is sufficient to provide a photo detector which receives either of the zero order diffraction beam or the first order reflection beam. Suitably, a small photo detector is disposed at the position of the virtual image P' so that the information contained in the reflection beam is picked up.

It will be appreciated from the foregoing that the focusing of the beams as well as the separation of the incident beam and the reflection beam can be performed by means of the hologram. In this case, there is a great advantage that the object lens is no longer necessary, and also it has the same advantage as the diffraction grating since the size of the pickup device can be considerably reduced.

It is understood that according to the present invention, the simplification and the substantial reduction in size of the pickup device becomes possible. This also leads to a substantial reduction in cost of the pickup device. This feature is especially very important to a system in which the pickup device is incorporated. For instance a video disc player system is constructed in such a manner that an entire pickup assembly is moved in a radial direction of the recording disc so that the read-out light beam is translated along the radial direction. In the prior art, if the system were constructed in the above manner, the relatively large diameter of the pickup device would have resulted also in an increase in the size of the driving parts such as the magnetic circuit provided at the vicinity of the pickup device. However, as is readily understood, such a disadvantage can be alleviated by the present invention.

While particular embodiments of the present invention have been shown and described, it will be obvious to those skilled in the art that changes and modifications may be made without departing from this invention in its broader aspects, and therefore, the aim in the appended claims is to cover all such changes and modifications as fall within the true spirit and scope of this invention.

What is claimed is:

1. An optical pickup device for picking up information recorded on a recording medium comprising:
    an illuminating light beam source;
    diffraction means for diffracting the illuminating light beam into ±1 order diffraction beams and directing one of the ±1 order diffraction beams towards the surface of said recording medium, said diffraction means diffracting the beam reflected by said surface of said recording medium into ±1 order diffraction beams to separate said beam reflected by said surface of said recording medium from said illuminating light beam; and,
    a photo detection means positioned for directly receiving one of said ±1 order diffracted reflected beams from said diffraction means and providing an output signal carrying said information recorded on said recording medium.

2. An optical pickup device as claimed in claim 1, wherein said diffraction means includes a diffraction grating and an objective lens interposed between said illuminating light beam source and said surface of said recording medium and interposed between said surface and said photo detector means, and wherein said objective lens is used for focusing said illuminating light beam on said surface of said recording medium, and said illuminating light beam source and said photo detector means are disposed on one side of said diffraction grating and angularly spaced by an equal angle with respect to a normal to the surface of said diffraction grating.

3. An optical pickup device as set forth in claim 2, wherein said diffraction grating has a plurality of equally spaced slits whose depth is equal to a half of wave length of said illuminating light beam.

4. An optical pickup device as claimed in claim 1, wherein said diffraction means includes a holographic lens, said holographic lens directly focusing said illuminating light beam on said surface of said recording medium and directly receiving said beam reflected by said surface of said recording medium.

* * * * *